May 24, 1938. E. W. MILLER 2,118,453
THROATED GEAR SHAPING MACHINE
Filed May 23, 1934 6 Sheets-Sheet 5

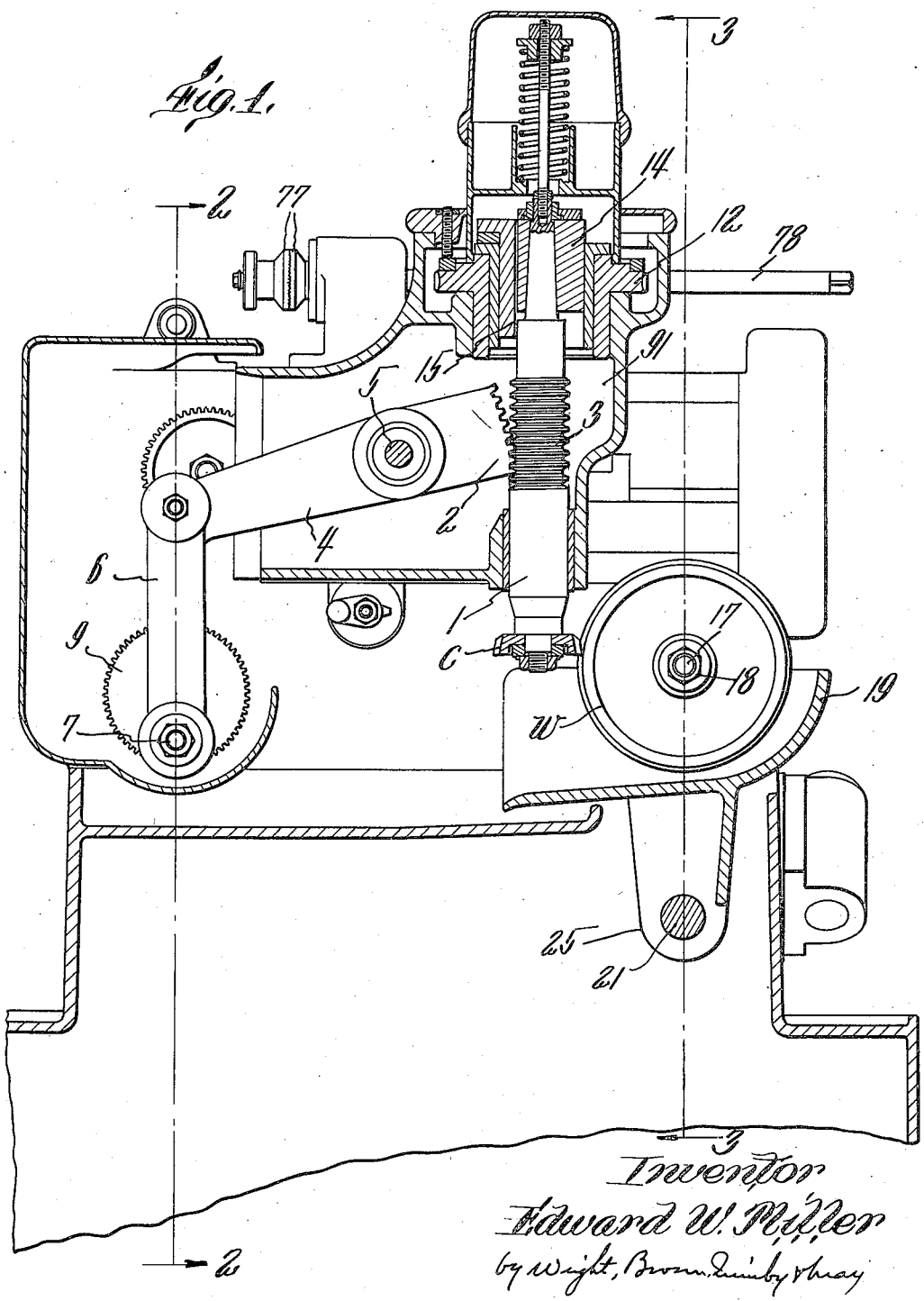

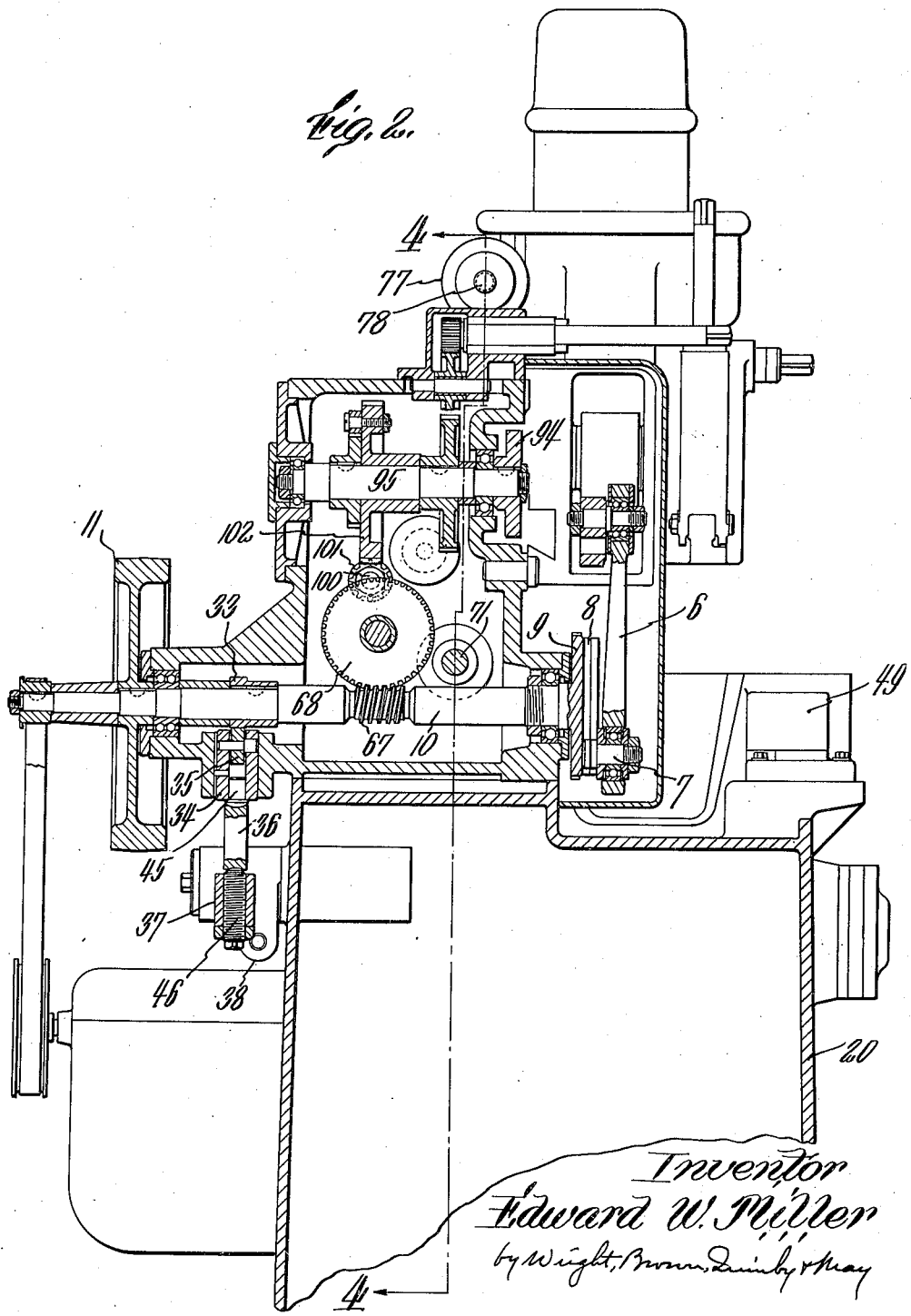

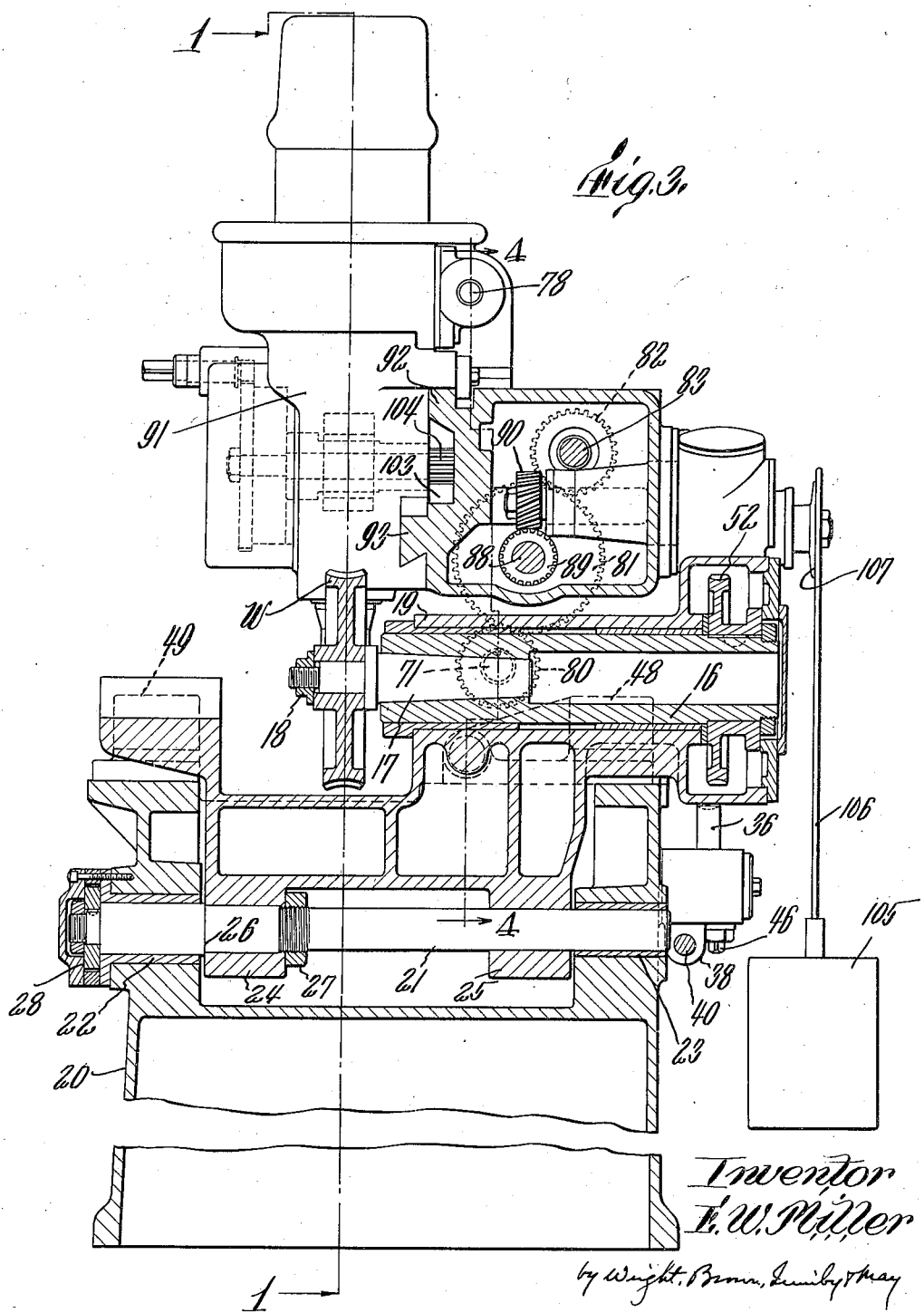

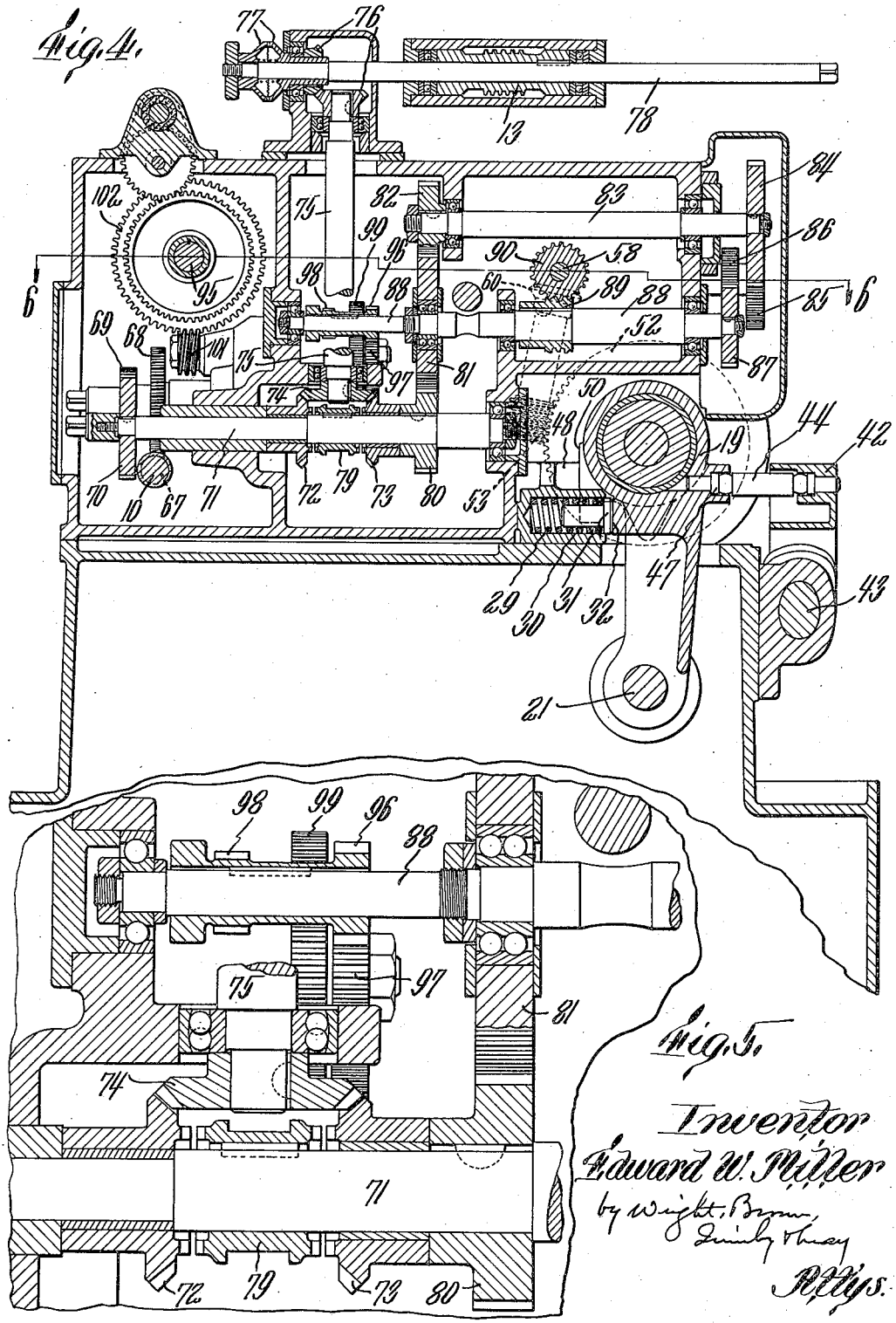

Inventor
Edward W. Miller
by Wright, Brown, Quinby & May
Attys

May 24, 1938.  E. W. MILLER  2,118,453

THROATED GEAR SHAPING MACHINE

Filed May 23, 1934  6 Sheets—Sheet 6

Inventor
Edward W. Miller
by Wright, Brown, Quinby & Reay
Attys.

Patented May 24, 1938

2,118,453

UNITED STATES PATENT OFFICE 2,118,453

THROATED GEAR SHAPING MACHINE

Edward W. Miller, Springfield, Vt., assignor to The Fellows Gear Shaper Company, Springfield, Vt., a corporation of Vermont Application May 23, 1934, Serial No. 727,123

9 Claims. (Cl. 90—9)

The present invention relates to gear shaping machines of the type in which a cutter having generally the form of a gear, but with cutting edges at one end and clearance at the sides of its teeth, is reciprocated in the direction of its axis so as to cut in the manner of a planing tool. At the same time the cutter and work are rotated about their respective axes at speeds in harmony with one another whereby teeth of a form conjugate to the outlines of the cutter teeth are generated in the work. More particularly it is concerned with the production of throated gears and hour glass worms, which are concave in the longitudinal, or axial, direction between their ends, at least as to the spaces between their teeth. In the performance of the generating action upon such gear elements, the axes about which the cutter and work rotate are both non-intersecting and non-parallel; and usually each axis is perpendicular to a line parallel to the other.

The present invention is related to my prior application Serial No. 510,958, filed January 24, 1931, entitled Machine for generating throated gear elements, and includes similar subject matter, together with useful new features. As compared with the prior application the new features herein set forth relate to the means for holding, driving and backing off the work, and have for their main object to provide a means which can be used with work pieces varying widely from one another in diameter, without involving any problems of rubbing between the contiguous teeth of the cutter and work piece when the latter is backed off. In effecting this object I have devised an apron or holder for the work spindle which is pivoted to swing on an axis parallel to the work spindle axis, and in such relation thereto that such swinging increases and decreases the center distance between cutter and work, preferably in the maximum ratio to the distance through which the apron is so moved; and have provided other improvements of mechanism and arrangements of parts related thereto.

In the drawings,—

Fig. 1 is a vertical section of a machine embodying the elements of this invention;

Fig. 2 is a vertical section taken on line 2—2 of Fig. 1;

Fig. 3 is a vertical section taken on line 3—3 of Fig. 1;

Fig. 4 is a section taken on line 4—4 of Figs. 2 and 3;

Fig. 5 is a fragmentary sectional view showing on a larger scale a portion of the mechanism designated in Fig. 4;

Like reference characters designate the same parts wherever they occur in all the figures.

Figure 6:
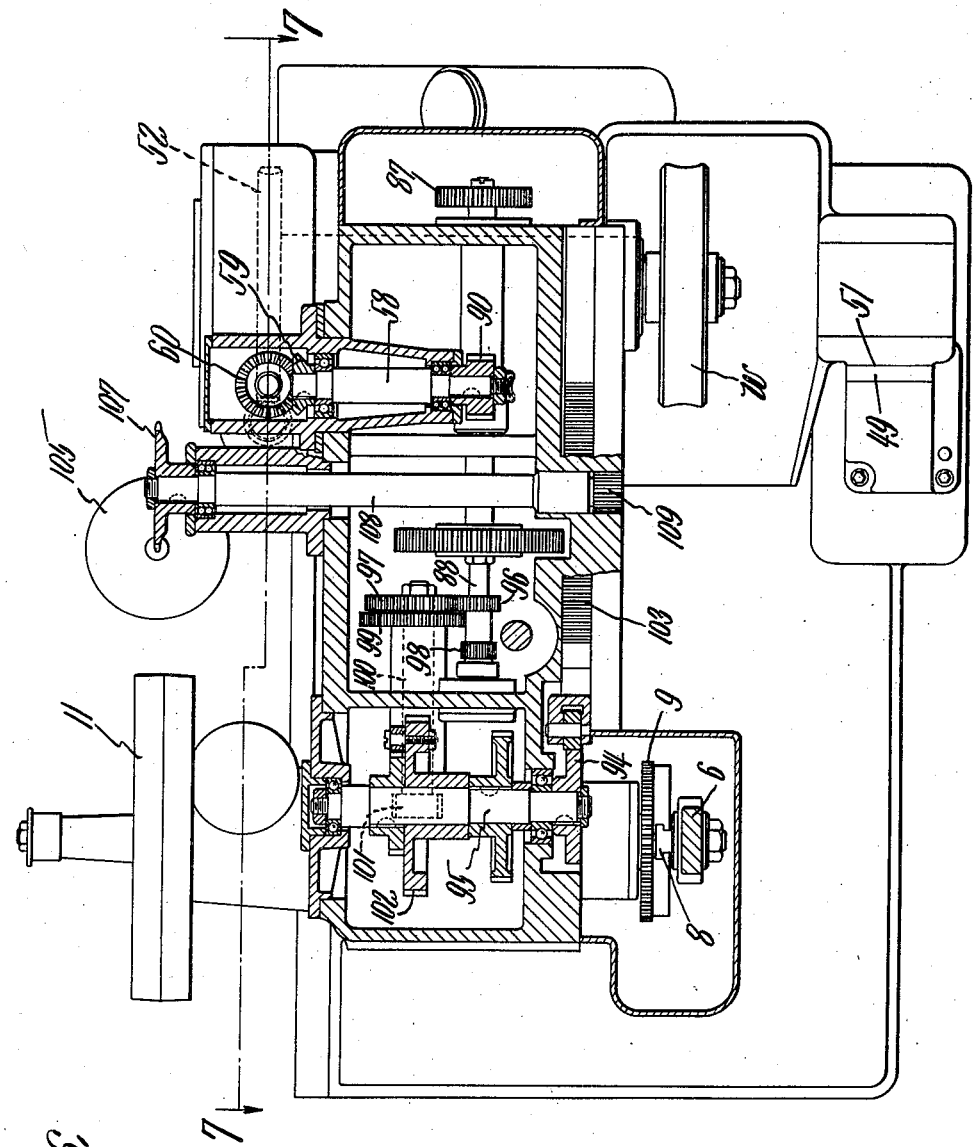
Fig. 6 is a horizontal section taken on line 6—6 of Fig. 4.

The cutter C, of the type described in the introductory part of this specification, is carried by a reciprocative and rotatable cutter spindle 1, whereby it is traversed tangentially of the work W, mounted on a transverse work spindle. The cutter spindle is reciprocated by a gear segment 2, rack teeth 3, rock lever 4, oscillating on pivot 5, connecting rod 6, and crank pin 7. The crank pin is adjustably mounted in a diametral slot 8 (Fig. 2) in a disk 9, carried by a main shaft 10 which is driven by a belt pulley 11 or other prime mover. The spindle is simultaneously rotated by a worm wheel 12, driven by a worm 13 (Fig. 4), and transmitting rotation by means of complemental guides 14 and 15 secured to the spindle and worm wheel respectively and fitted to slide axially one on the other. The complemental contact faces of the guides may be either parallel to the axis of the spindle or helicoidal. When of the latter formation, as they must be for the production of throated gears, they give an increment of rotation to the cutter in one direction during the cutting stroke and in the opposite direction during the return stroke, whereby a cutter having helical teeth of a helix angle complemental to the angle of helical teeth to be generated in the work piece, may be advanced and retracted along the prolonged helices of its teeth.

The work spindle 16, to which the work piece is connected by an arbor 17 and nut 18, is shown in detail in Fig. 3. It is mounted rotatably in an apron or holder 19. In this illustrative machine, in which the cutter spindle is vertical, the work spindle is horizontal, whereby the cutter, in traversing the work piece tangentially, is caused to generate teeth with a concave curvature, which is the throated or hour glass formation previously referred to; there being no feed or displacement in the direction of the work spindle axis of either the cutter or work piece relatively to the other.

This arrangement of vertical cutter spindle and horizontal work spindle typifies, for the purposes of the generic invention here involved, any operative arrangement of such spindles arranged on non-parallel and non-intersecting axes; or more specifically, spindles of which the axis of each is perpendicular to a line parallel to the axis of the other.

In order to avoid rubbing of the cutter teeth on the work during return strokes of the cutter, and to permit substitution of work cutters and work pieces of different relative diameters from those here shown without causing complications in the problem of avoiding rubbing, the apron or holder 19 is mounted to swing about an axis parallel to the work spindle axis, whereby all positions in which the work spindle may be placed by swinging of the apron are parallel to one another. In this illustration the apron is connected to the stationary base 20 of the machine by a pivot shaft 21 which is adapted to turn in separated bearings 22, 23, and to which the apron is connected by spaced apart lugs 24, 25, the former of which is clamped to the pivot shaft between a shoulder 26 on the latter and a nut 27. Endwise movement of the pivot shaft is prevented by suitable thrust bearings, an example of which is shown at 28. In this illustration the pivot 21 is vertically below the work spindle. A more generic expression of the relationship which exists between the axes of the work and cutter spindles and the apron pivot is the following:—The work spindle and pivot axes are substantially parallel to one another and are located in a plane which is substantially parallel to the cutter spindle axis, and lines lying in such plane parallel to the cutter spindle are substantially perpendicular to the work spindle and pivot axes. Such plane coincides with the plane of section designated by the line 3—3 in Fig. 1.

Figure 7:
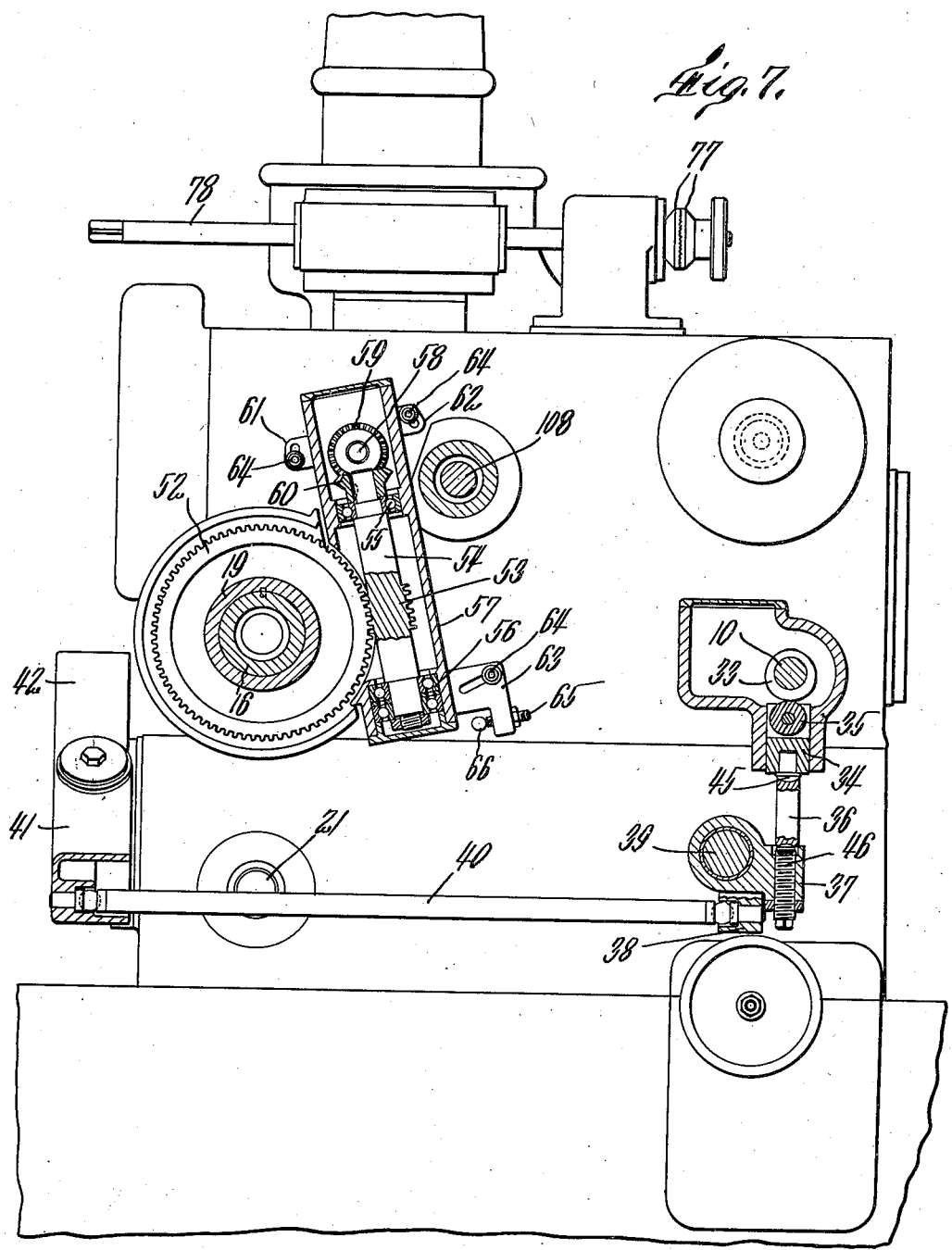
Fig. 7 is a vertical section taken on line 7—7 of Fig. 6.

Force tending constantly to withdraw the work from the cutter is exerted by a spring 29 (Fig. 4) contained in a socket 30 in a part of the base structure of the machine, and pressing through a follower 31 against an abutment shoulder 32 on the apron or holder 19. Positive mechanism is provided to overcome the yielding force of this spring and hold the work rigidly up to the cutter during the cutting strokes only. Such mechanism consists of a cam 33 on the main shaft 10, (Figs. 2 and 7), a follower slide 34 having an antifriction roll 35 in contact with the cam and movable vertically in a guideway in the frame structure, a thrust rod 36, a bell crank lever having arms 37 and 38 pivoted on a stud 39, a thrust rod 40, a lever having arms 41 and 42 pivoted on an inclined stud 43, and a thrust rod 44 (Fig. 4). The thrust rod 36 has ball and socket engagement at its opposite ends respectively with a spherical headed stud 45 in follower 36, and the spherical end of an adjustable abutment screw 46 in arm 37 of the bell crank lever. Similarly the rod 40 has ball and socket engagement at its opposite ends with the bell crank lever arm 38 and the arm 41 of the second lever; and rod 44 is confined with ball and socket engagement between lever arm 42 and an abutment 47 in the outer side of apron 19. The base frame is equipped with abutments 48 (Fig. 4) and 49 (Fig. 6) spaced apart from one another longitudinally of the work spindle, against which contact faces 50 and 51 respectively of the apron are pressed firmly by the linkage just described. The adjustable screw 46 enables all looseness and backlash in this linkage to be taken up and the apron to be forced with any desired degree of pressure against the abutments 48 and 49. Cam 33, being on the shaft which reciprocates the cutter spindle, is therefore rotated in time with the spindle reciprocations; and it is provided with a rise and a descent at respectively opposite sides of its center, and with intermediate high and low dwells, suitably disposed to bring the work into cutting position prior to each cutting stroke, hold it there during the continuance of such stroke, and permit spring 29 to withdraw the work prior to each return stroke of the cutter and hold it clear of the cutter teeth during the return stroke.

By virtue of these principles, work pieces of different diameters can be substituted for one another to be cut by the same cutter, or by cutters of different diameters, without involving liability of rubbing by the cutter on its return strokes, for the work spindle is moved bodily and all positions of its axis are parallel to one another. At the same time the necessary clearance is effected by a relatively small displacement of the work spindle; a displacement far less than that which would cause disengagement of the worm wheel 52 by which it is rotated from the worm 53 which drives such wheel.

Rotation is imparted to the work in harmony with the progressive rotation of the cutter, so that successive strokes of the cutter will smoothly generate teeth conjugate to a gear having the same pitch, pressure angle and helix angle of teeth as the cutter, by means of the worm and wheel last mentioned. The worm wheel is keyed to the outer end of the work spindle 16 (Fig. 3) and the worm 53 (shown best in Fig. 7) is carried by a shaft 54 which is mounted in bearings 55 and 56 in a housing 57 secured adjustably on the rear side of the machine frame. Such adjustment is arranged to take place angularly about the axis of a shaft 58 from which rotation is imparted to the worm shaft 54 by bevel gears 59 and 60. The housing is provided with lugs 61, 62 and 63 containing slots, concentric to shaft 58, through which clamping bolts 64 pass to tapped holes in the machine base structure. Lug 63 has an extension in which there is an adjustable stop screw 65 bearing against a fixed abutment 66 for accurate regulation of the mesh between the worm and worm wheel. It will be noted that this worm is at relatively the same side of the worm wheel as the cutter is of the work, and that the axis of the worm is arranged at an acute angle (the vertex of which is at the opposite side of the work spindle from the apron pivot) with the plane established by the axes of the work spindle and work apron pivot when set to mesh with a worm wheel as large as, or larger than, that shown. Thus when the work is backed off from the cutter, the worm wheel is partially withdrawn from the worm, but without passing out of mesh therewith, and in such a manner as to hold the work so that the sides of the grooves cut therein will not be rubbed against by the cutter teeth on the return stroke of the latter, while when the work is returned to cutting position, the worm wheel is brought into full mesh with the worm. This mode of adjustably mounting the worm 53 enables it to be easily moved aside for assemblage of the worm wheel with the work spindle, and permits substitution of different worm wheels for one another.

The foregoing description sets forth substantially the entire novelty of the present invention, and particularly the features in which it differs from my prior application Serial No. 510,958, previously mentioned. Other details of the machine here shown comprise necessary mechanisms for driving, feeding and adjustment, for which I claim no originality of invention, except as their combination with the novel work-holding and backing-off means is an invention, and which I will describe briefly to complete the disclosure for the benefit of others skilled in the art.

The cutter spindle rotating worm 13 and the shaft 58 through which the work spindle is rotated, are driven simultaneously and in a prescribed speed ratio from the main shaft 10 through the following mechanism. A worm 67 on shaft 10 (Fig. 2) drives, by means of a worm wheel 68 and changeable gears 69 and 70 (Fig. 4), a shaft 71 on which bevel gears 72 and 73 are loosely mounted in mesh with a bevel gear 74 on an upright shaft 75 which rotates worm 13 through bevel gears 76, a clutch 77, and shaft 78 on which the worm is splined. A sliding clutch 79 splined on shaft 71 may be clutched to either gear 72 or 73 so as to rotate shaft 75 in either direction.

A gear 80 drives, through the loosely mounted idle gear 81, gear 82, shaft 83, changeable gear train 84, 85, 86 and 87, a shaft 88 on which is keyed a throated helical gear 89 meshing with a conjugate gear 90 on shaft 58.

It will be appreciated that the rotation of the cutter and work spindles is relatively slow while the reciprocation of the cutter is relatively fast; that is, the cutter makes a number of strokes while turning through a small angle.

The cutter spindle, and its rotational driving worm wheel 12 and worm 13, are carried by a saddle or carriage 91 slidable on horizontal guides 92, 93 (Fig. 3) on the stationary frame, in other words, perpendicular to the plane of the apron pivot and work spindle axes. This saddle is advanced by a depth feed cam 94 (Fig. 6) at the beginning of the cutting cycle to cause penetration of the cutter teeth to the required depth into the work piece. Said depth feed cam is keyed to a shaft 95 which is rotated by shaft 88 through a sliding gear transmission 96—97 or 98—99, shaft 100 and meshing gears 101, 102.

The depth feed cam 94 applies force to the cutter carriage through a rack bar 103 which is adjustably coupled to the carriage through a pinion 104, rotatably mounted and locked in the carriage; while the carriage is yieldingly pressed back against the cam, and withdrawn from the work when permitted by the cam, by a weight 105 suspended by a chain 106 from a sprocket wheel 107; such sprocket wheel being keyed to a shaft 108 on which there is mounted a pinion 109 in mesh with rack teeth (not shown) on the carriage. The means thus briefly described for adjustably engaging the cutter carriage with the depth feed cam are substantially the same as those shown in the patent to Edwin R. Fellows, No. 1,463,806, to which reference may be had for further description. By means of such an adjustment in the present machine, it is possible to cut throated gears differing in diameter from one another through a wide range; and this without complicating the problem of backing off the work.

What I claim and desire to secure by Letters Patent is:

1. In a gear shaping machine, a pivotally mounted work spindle apron, a work spindle rotatably mounted in said apron, a driving gear on said work spindle, a worm in mesh with said driving gear, a shaft substantially parallel to the worm work spindle in geared connection with the worm for driving the latter, and means for adjusting the worm angularly about the axis of said shaft to regulate its mesh with said driving gear.

2. In a gear shaping machine, a base structure, a reciprocative and rotative cutter spindle, a work spindle mounted at one side of and transverse to the cutter spindle, an apron in which said work spindle is rotatably mounted, a pivot for said apron substantially parallel to the work spindle, means for swinging said apron so as to withdraw the work spindle from and advance it toward the cutter spindle, and abutments for arresting the apron in its advance movement toward the cutter spindle, spaced apart from one another and located at respectively opposite sides of the common perpendicular to the two spindles.

3. In a gear shaping machine of the character described, a base structure, having alined separated pivot supports, a pivot shaft mounted on said supports, a work spindle apron supported on said pivot shaft at points respectively adjacent to the pivot supports, a work spindle mounted rotatably in said apron and adapted to carry a work piece in a plane between said separated supports, abutments for arresting the apron in a given position, said abutments being spaced apart and located at respectively opposite sides of the location of the work piece, and mechanism for alternately forcing the apron up against said abutments and withdrawing it therefrom.

4. In a gear shaping machine, a base structure having separated alined pivot bearings and separated abutments, each abutment being located in the same plane, perpendicular to the pivot axis, with one of said pivot bearings, a work spindle apron having pivot means located in said bearings, and mechanism for forcing the apron against said abutments.

5. In a gear shaping machine, a base structure having separated pivot bearings, a pivot shaft located in said bearings, a work spindle apron having a part located between said bearings through which the pivot passes, separated abutments for the apron located respectively in substantially the same planes, perpendicular to the pivot axis, with the respective bearings, the apron having complemental contact portions for engagement with said abutments, a work spindle mounted in the apron so arranged as to mount a work piece in a location between the respective abutments and contact parts, and mechanism for forcing the apron and its contact parts against said abutments.

6. A gear generating machine for producing throated gears and the like comprising a cutter spindle mounted to reciprocate endwise and to rotate about its axis adapted to carry a gear shaped planing cutter, a driving shaft, mechanism actuated by said driving shaft for reciprocating said spindle, a work spindle adapted to carry a gear blank, an apron having means for holding said spindle in a position transverse to and at one side of the path of movement of the cutter spindle with the circumference of its supported gear blank tangent to said path, said apron being mounted movably with provision for carrying the work spindle toward and away from the cutter spindle path while maintaining all positions of the work spindle parallel to one another, mechanism driven by the driving shaft for rotating the spindles in harmony with one another for generation of teeth in such a gear blank by a cutter carried by the cutter spindle, abutment means for the apron located to arrest the apron in the approaching movement of the work spindle toward the path of the cutter spindle, a spring acting on the apron tending to displace it from said abutment means, a cam on the driving shaft and thrust transmitting means between said cam and apron; the cam having high and low portions arranged to act on the thrust transmitting means in time with the reciprocations of the cutter spindle to hold the apron against the said abutment means during travel of the cutter spindle in the cutting direction, and to permit displacement of the apron from said abutment means during travel of the cutter spindle in the opposite direction.

7. A gear shaping machine for generating throated gears and the like comprising a cutter spindle mounted to rotate about its longitudinal axis and to be movable endwise, a gear shaped planing cutter carried by said spindle, a work carrier, pivot means supporting said work carrier, a work spindle rotatably mounted in said carrier, the axis of said pivot means and the axis of said work spindle being in a plane substantially parallel to the cutter spindle axis and both transverse to the cutter spindle axis, the work spindle having means for mounting a gear blank tangent to the path of the adjacent side of the cutter, mechanism for reciprocating the cutter spindle endwise with simultaneous angular motion about its axis such that its teeth travel in helical paths complemental to the teeth to be generated in the work piece, means for progressively rotating both the cutter spindle and work spindle in generative harmony with one another, and means for swinging the work carrier about the axis of said pivot means back and forth in time with the reciprocations of the cutter spindle such as to relieve the work from contact with the cutter teeth during the return strokes of the cutter.

8. A gear shaping machine comprising a supporting structure, a cutter spindle, guiding means for said spindle arranged to permit endwise reciprocative movement thereof and to cause angular back and forth movement in consequence of such reciprocative movement, a work spindle apron, a pivot for said apron mounted in the supporting structure with its axis transverse to and at one side of the cutter spindle axis, a work spindle rotatably mounted in said apron also at one side of and transverse to the cutter spindle axis, means for reciprocating the cutter spindle, means for moving the apron angularly about its pivot axis in time with the cutter spindle reciprocations so as alternately to relieve a work piece on the work spindle from contact with a cutter on the cutter spindle during non-cutting return strokes of the latter and bring such work piece into cutting relation with such cutter during the cutting strokes of the latter, and means for progressively rotating the cutter spindle and work spindle in generative harmony with one another, said rotating means including a worm wheel on the work spindle and a worm meshing therewith located at the same side of the work spindle axis as the cutter spindle and at an acute angle to the plane through the work spindle axis parallel to the cutter spindle.

9. In a gear generating machine for producing throated gears and the like, the combination with a reciprocative and rotatable vertical cutter spindle, of a work spindle, a holder in which said work spindle is rotatably mounted arranged to support the work spindle at one side of the cutter spindle and being pivoted on an axis parallel to the work spindle and beneath the latter, means for moving said holder about its axis so as to withdraw and advance the work spindle respectively away from and toward the cutter spindle, and means for rotating the work spindle including a gear thereon and a worm meshing with said gear, said worm being mounted at the same side of the work spindle axis as the cutter spindle and in such a manner as to hold the work so that the sides of the teeth cut therein will not be rubbed against by the teeth of a cutter on the cutter spindle when the work spindle is thus withdrawn.

EDWARD W. MILLER.